United States Patent
Laredo et al.

(10) Patent No.: US 10,558,459 B2
(45) Date of Patent: *Feb. 11, 2020

(54) APPROACH TO SUMMARIZE CODE USAGE

(71) Applicant: International Business Machines Corporation, Armonk, NY (US)

(72) Inventors: Jim Laredo, Katonah, NY (US); Aleksander Slominski, Riverdale, NY (US); John Erik Wittern, New York, NY (US); Annie Tsui Tsui Ying, Vancouver (CA); Christopher Charles Young, Sleepy Hollow, NY (US); Yunhui Zheng, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,257

(22) Filed: May 12, 2017

(65) Prior Publication Data

US 2018/0329704 A1  Nov. 15, 2018

(51) Int. Cl.
   *G06N 99/00* (2019.01)
   *G06F 9/54* (2006.01)
   *G06F 8/77* (2018.01)

(52) U.S. Cl.
   CPC ............. *G06F 8/77* (2013.01); *G06F 9/547* (2013.01)

(58) Field of Classification Search
   None
   See application file for complete search history.

(56) References Cited

U.S. PATENT DOCUMENTS

| | | | | |
|---|---|---|---|---|
| 2012/0278659 | A1* | 11/2012 | Han | G06F 11/302 714/38.1 |
| 2015/0128156 | A1* | 5/2015 | Zhu | G06F 8/74 719/328 |
| 2017/0012838 | A1* | 1/2017 | Kashtan | G06F 8/73 |
| 2018/0121320 | A1 | 5/2018 | Dolby et al. | |
| 2018/0234464 | A1* | 8/2018 | Sim | H04L 63/205 |

OTHER PUBLICATIONS

Acharya et al., "Mining API patterns as partial orders from source code: from usage scenarios to specifications" (2007), Proceedings fo the 6th ESEC-FSE, pp. 25-34 [retrieved from https://dl.acm.org/citation.cfm?id=1287630].*

(Continued)

*Primary Examiner* — Brian W Wathen
(74) *Attorney, Agent, or Firm* — Amin, Turocy & Watson, LLP

(57) ABSTRACT

Techniques for autonomously generating a code usage summary associated with a web application programming interface request are provided. In one example, a computer-implemented method can comprise evaluating, by a system operatively coupled to a processor, data from a data repository, wherein the evaluating is based on a defined machine learning process. Also, the computer-implemented method can comprise generating, by the system, a usage summary of the data, wherein the usage summary is based on a statistic derived from a web application programming interface request, and the web application programming interface request is associated with the data.

18 Claims, 10 Drawing Sheets

(56) References Cited

OTHER PUBLICATIONS

Michail, A., "Data mining library reuse patterns using generalized association rules" (2000), Proceedings of the 22nd ICSE, pp. 167-176 [retrieved from https://dl.acm.org/citation.cfm?id=337200].*
Thummalapenta et al., "Parseweb: a programmer assistant for reusing open source code on the web" (2007), Proceedings of the 22nd ASE, pp. 204-213 [retrieved from https://dl.acm.org/citation.cfm?id=1321663].*
Holmes et al., Informing Eclipse API production & consumption, Eclipse Exchange Workshop, 2007, 5 pages.
Bruch et. al., Learning from examples to improve code completion systems, 2009, 10 Pages.
Ying et al.,Predicting source code changes by mining change history, IEEE Transactions on Software Engineering, Sep. 2004,pp. 574-586, vol. 30.
Xie et al., MAPO: Mining API usages from open source repositories, 2006, 10 pages.
Mandelin et al., Jungloid mining: helping to navigate the API jungle, Jun. 2005, 14 pages.
Ying, Summarizing Requests, APIful Blog, Apr. 24, 2017, http://www.apiful.io/intro/2017/04/27/summarizing-requests.html, Last accessed May 10, 2017, 4 Pages.
Mell et al., "The NIST Definition of Cloud Computing", National Institute of Standards and Technology, Special Publication 800-145, Sep. 2011, 7 pages.
Non-Final Office Action received for U.S. Appl. No. 15/842,429 dated Jun. 14, 2019, 54 pages.
Final Office Action received for U.S. Appl. No. 15/842,429 dated Oct. 10, 2019, 33 pages.

* cited by examiner

US 10,558,459 B2

APPROACH TO SUMMARIZE CODE USAGE

BACKGROUND

The subject disclosure relates to summarizing code usage, and more specifically, to summarizing usage associated with one or more web application programming interface requests.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can summarize code usage associated with one or more web application programming interface requests are described.

According to an embodiment, a computer-implemented method is provided. The computer-implemented method can comprise evaluating, by a system operatively coupled to a processor, data from a data repository, wherein the evaluating can be based on a defined machine learning process. The computer-implemented method can also comprise generating, by the system, a usage summary of the data, wherein the usage summary can be based on a statistic derived from a web application programming interface request, and the web application programming interface request can be associated with the data.

According to another embodiment, another computer-implemented method is provided. The computer-implemented method can comprise evaluating, by a system operatively coupled to a processor, data from a data repository, wherein the evaluating can be based on a defined machine learning process. The computer-implemented method can also comprise generating, by the system, a usage summary of the data, wherein the usage summary can comprise a cluster of web application programming interface requests from a plurality of web application programming interface requests, and the cluster of web application programming interface requests can be associated with the data.

According to another embodiment, a computer program product is provided. The computer program product can be for summarizing data usage associated with a web application programming interface request. The computer program product can comprise a computer readable storage medium having program instructions embodied therewith. The program instructions can be executable by a processor to cause the processor to evaluate data from a data repository based on a defined machine learning process. Also, the program instructions can cause the processor to generate a usage summary of the data. The usage summary can comprise a statistic derived from a web application programming interface request associated with the data. The usage summary can also comprise a cluster of web application programming interface requests from a plurality of web application programming interface requests, wherein the cluster of web application programming interface requests can be associated with the data.

DETAILED DESCRIPTION

Figure 1:
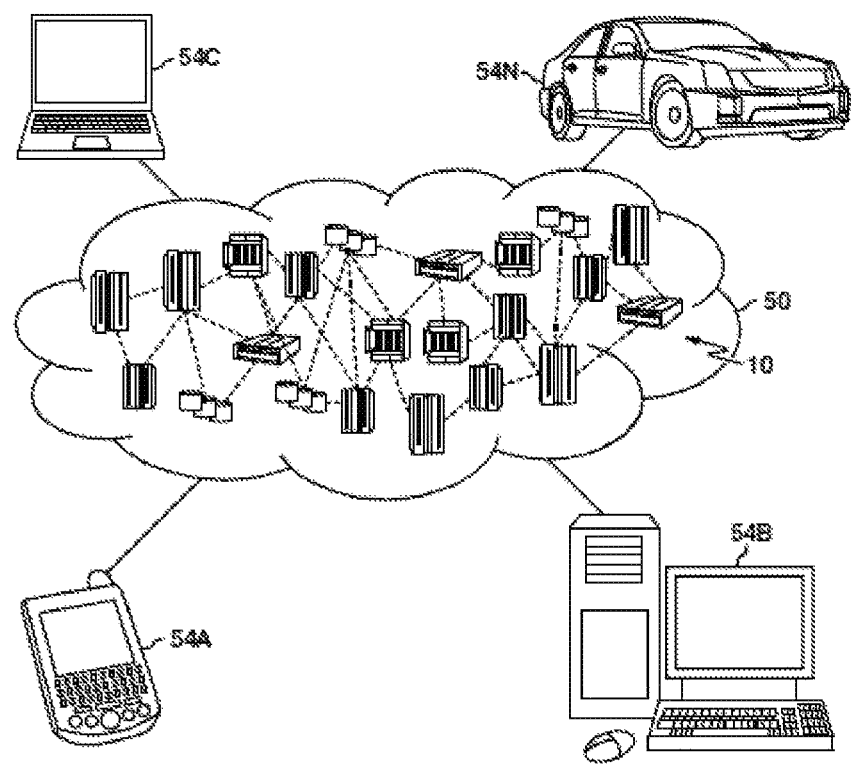
FIG. 1 depicts a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
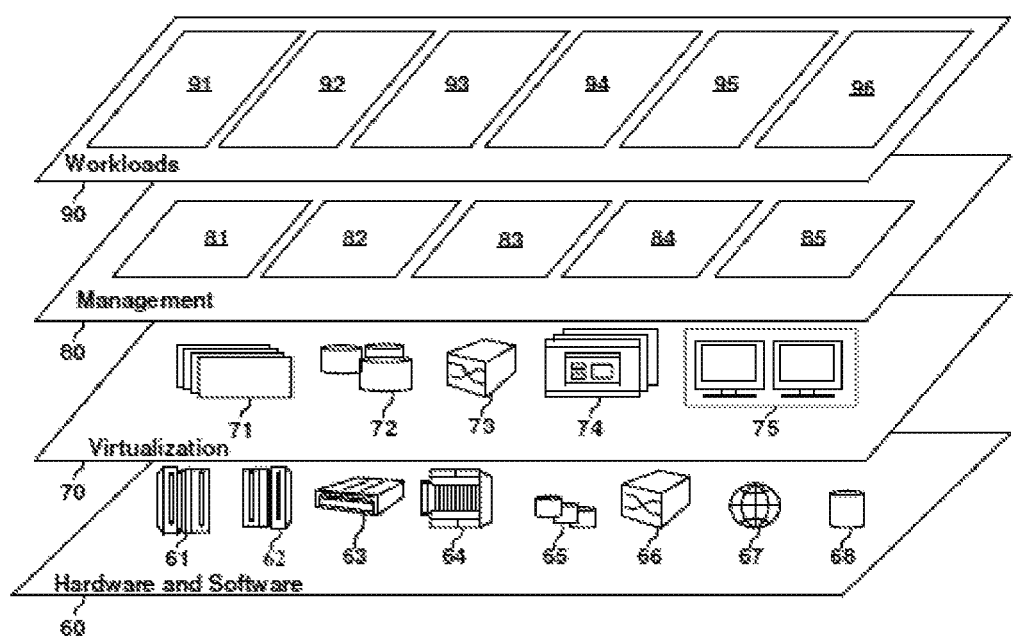
FIG. 2 depicts abstraction model layers in accordance with one or more embodiments described herein.

Referring now to FIG. 2, a set of functional abstraction layers provided by cloud computing environment 50 (FIG. 1) is shown. Repetitive description of like elements employed in other embodiments described herein is omitted for sake of brevity. It should be understood in advance that the components, layers, and functions shown in FIG. 2 are intended to be illustrative only and embodiments of the invention are not limited thereto. As depicted, the following layers and corresponding functions are provided. Repetitive description of like elements employed in other embodiments described herein is omitted for sake of brevity.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and summarizing code usage 96. Various embodiments of the present invention can utilize the cloud computing environment described with reference to FIGS. 1 and 2 to summarize code usage associated with one or more web application programming interface requests.

As used herein, the term "web application programming interface (web API)" can refer to a programmatic interface that can facilitate exposing, analyzing, collecting, and/or sending data over hypertext transfer protocols (HTTP). Web APIs can be used to build services compatible with a broad range of devices (e.g., servers, personal computers, smart phones, smart wearables such as smart watches, and/or tablets) and/or software (e.g., web browsers, operating systems such as ANDROID® and/or IOS®, websites, and/or web applications). Also, web APIs can follow representational state transfer (REST) principals.

Web APIs have become ubiquitous in recent years and continue to grow in popularity. The majority of commercialized software applications offer some form of a web API, and many web APIs interact with one or more cloud services. When invoking such a web API, a proven type of effective web API documentation can include one or more code examples and/or one or more pieces of code usage information. However, code examples and/or code usage information are traditionally widely dispersed and difficult to locate. For example, a code example and/or code usage information may: not be available in a formal type of documentation such as on official API documentation; and/or may be buried in code stored in a data repository and thus, unavailable to search engines and/or aggregation software.

Various embodiments of the present invention can be directed to computer processing systems, computer-implemented methods, apparatus and/or computer program products that facilitate the efficient, effective, and autonomous (e.g., without direct human guidance) summarization of code usage information associated with one or more web API requests. One or more embodiments described herein can aggregate one or more web API requests to: determine statistics regarding the subject requests; and/or generate lessons, utilizing machine learning processes, based on the subject requests. Further one or more embodiments described herein can cluster similar web API requests to identify one or more representative web API requests indicative of a subject topic and/or parameter. Moreover, various embodiments described herein can filter one or more web API requests to identify one or more web API requests that meet a quality standard.

The computer processing systems, computer-implemented methods, apparatus and/or computer program products employ hardware and/or software to solve problems that are highly technical in nature (e.g., collecting and/or analyzing code from a data repository to summarize code usage associated with one or more web API requests), that are not abstract and cannot be performed as a set of mental acts by a human. For example, a human, or a plurality of humans, cannot efficiently analyze all the code in a data repository nor stay up-to-date with new code being added to the data repository on a constant basis. In contrast, various embodiments of the computer processing systems, computer-implemented methods, apparatus and/or computer program products employing hardware and/or software described herein can analyze insurmountable amounts of code in a data repository and generate a summary of code usage in association with one or more web API requests. The summary can include, but is not limited to: statistics regarding the web API requests and their parameters, lessons learned from the web API requests using machine learning process (e.g., via artificial intelligence systems), and/or one or more web API request representatives that can be indicative of similarities between web API requests. Moreover, various embodiments described herein can filter web API requests prior to generating the summary so as to ensure that the summary is based on one or more web API requests that meet a predefined criterion.

One or more embodiments may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 3:
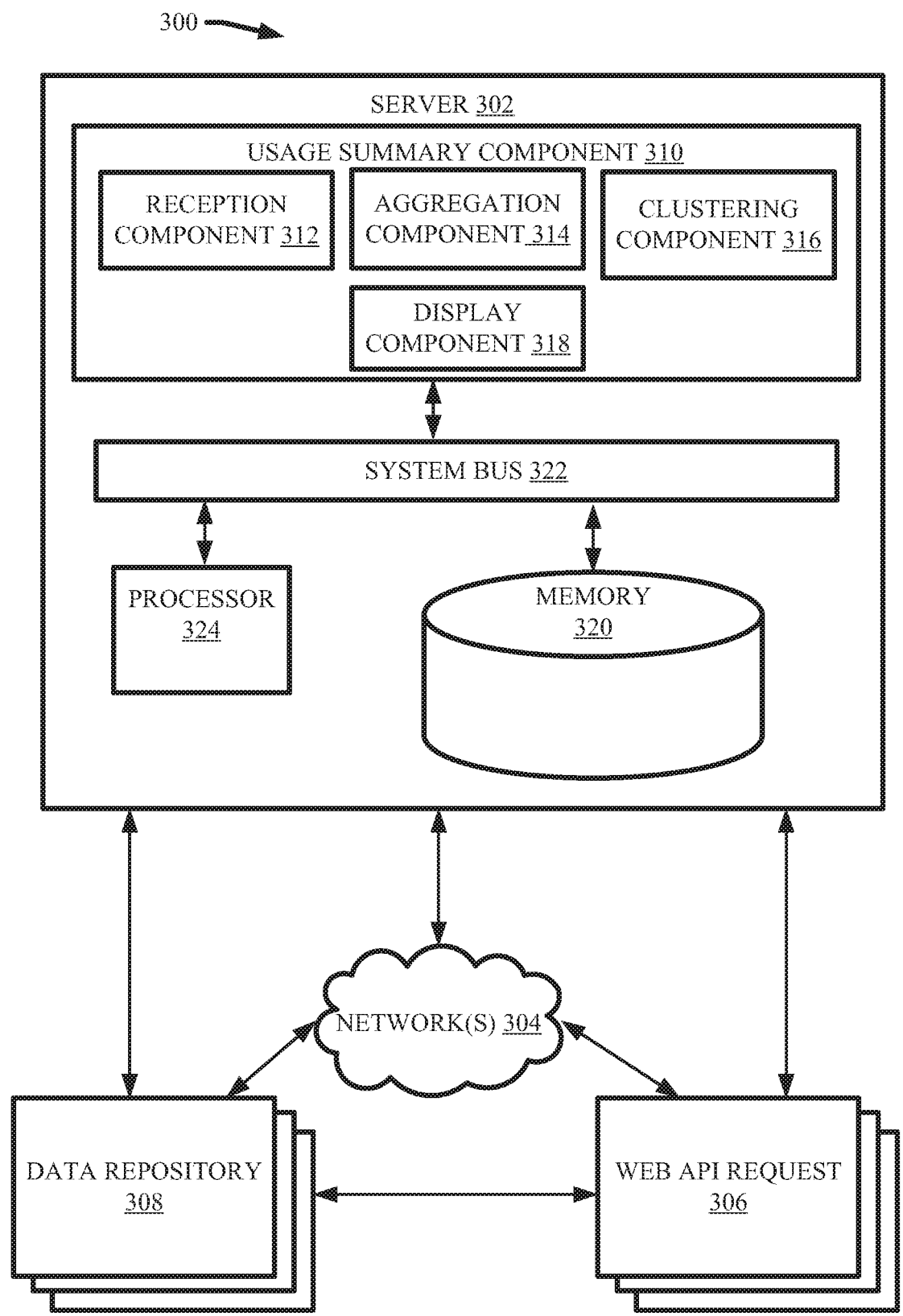
FIG. 3 illustrates a block diagram of an example, non-limiting system that can summarize code usage associated with one or more web application programming interface requests in accordance with one or more embodiments described herein.

FIG. 3 illustrates a block diagram of an example, non-limiting system 300 that can summarize code usage associated with one or more web APIs. Repetitive description of like elements employed in other embodiments described herein is omitted for sake of brevity. Aspects of systems (e.g., system 300 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 3, the system 300 can comprise one or more servers 302, one or more networks 304, one or more web API requests 306, and one or more data repositories 308. The server 302 can comprise usage summary component 310. The usage summary component 310 can further comprise reception component 312, aggregation component 314, clustering component 316, and display component 318. Also, the server 302 can comprise or otherwise be associated with at least one memory 320. The server 302 can further comprise a system bus 322 that can couple to various components such as, but not limited to, the usage summary component 310 and associated components, memory 320 and/or a processor 324. While a server 302 is illustrated in FIG. 3, in other embodiments, multiple devices of various types can be associated with or comprise the features shown in FIG. 3. Further, the server 302 can communicate with the cloud environment depicted in FIGS. 1 and 2 via the one or more networks 304.

One or more entities utilizing one or more web APIs can generate one or more web API requests 306. The one or more web API requests 306 can send and/or request data to and/or from one or more data repositories 308. The web API requests 306 can be operably coupled to the server 302, and/or the web API requests 306 can communicate with the server 302 via one or more networks 304. Also, the web API requests 306 can be operably coupled to the data repository 308, and/or the web API requests 306 can communicate with the data repository 308 via one or more networks 304.

The one or more data repositories 308 can comprise one or more devices that store data. The one or more data repositories 308 can be located in a cloud environment and/or can be reached via cloud technology. For example, the one or more data repositories 308 can store one or more files for one or more software projects (e.g., proprietary and/or open-source projects). One or more of the software projects stored in the data repositories 308 can be accessed by a unique universal resource locator (URL). In various embodiments described herein, the one or more data repositories 308 can comprise one or more version control systems. The data repositories 308 can be open-source repositories or proprietary repositories. Example data repositories 308 can include, but are not limited to: GIT®, GITHUB®, VERACITY®, ARX, BITKEEPER®, CODEVILLE®, DARCS®, DCVS®, FOSSIL®, GNU ARCH®, GNU BAZAAR®, MERCURIAL®, MONOTONE®, SVK®, TEAM FOUNDATION SERVER®, VISUAL STUDIO TEAM SERVICES®, and/or VAULT®. The data repositories 308 can be operably coupled to the server 302, and/or the data repositories 308 can communicate with the server 302 via one or more networks 304. Also, the data repositories 308 can be operably coupled to the web API requests 306, and/or the data repositories 308 can communicate with the web API requests 306 via one or more networks 304.

The one or more networks 304 can comprise wired and wireless networks, including, but not limited to, a cellular network, a wide area network (WAN) (e.g., the Internet) or a local area network (LAN). For example, the server 302 can communicate with the data repository 308 and the web API request 306 (and vice versa) using virtually any desired wired or wireless technology including for example, but not limited to: cellular, WAN, wireless fidelity (Wi-Fi), Wi-Max, WLAN, Bluetooth technology, cloud technology, a combination thereof, and/or the like. Further, although in the embodiment shown the usage summary component 310 can be provided on the one or more servers 302, it should be appreciated that the architecture of system 300 is not so limited. For example, the usage summary component 310, or one or more components of usage summary component 310, can be located at another computer device, such as another server device, a client device, etc.

The reception component 312 can receive one or more of the web API requests 306 and/or data from the one or more data repositories 308 (e.g., code examples, and/or code usage information). The reception component 312 can be operably coupled to the server 302, and/or the reception component 312 can communicate with the server 302 via one or more networks 304. The reception component 312 can be operably coupled to the usage summary component 310, and/or the reception component 312 can communicate with the usage summary component 310 via one or more networks 304. Also, the reception component 312 can be operably coupled to the data repository 308, and/or the reception component 312 can communicate with the data repository 308 via one or more networks 304.

The aggregation component 314 can determine one or more statistics regarding the one or more web API requests 306 received by the reception component 312. The aggregation component 314 can be operably coupled to the reception component 312, and/or the aggregation component 314 can communicate with the reception component 312 via one or more networks 304. Additionally, while FIG. 3 illustrates the aggregation component 314 as comprising the server 302, other embodiments in which the aggregation component 314 is located outside the server 302 are also envisage.

In one or more embodiments, the aggregation component 314 can evaluate data received by the reception component 312 from one or more data repositories 308. The aggregation component 314 can be operably coupled to the reception component 312, and/or the aggregation component 314 can communicate with the reception component 312 via one or more networks 304. The aggregation component 314 can evaluate the data using one or more machine learning processes. Further, in various embodiments, the aggregation component 314 can determine one or more statistics derived from the one or more web API requests 306 received by the reception component 312. Also, the one or more web API requests 306 can be associated with data evaluated by the aggregation component 314.

Statistics determined by the aggregation component 314 can regard, but are not limited to: the type of web API used to generate the one or more web API requests 306; one or more resources associated with the one or more web API requests 306; one or more endpoints associated with the one or more web API requests 306; one or more queries associated with one or more web API requests 306; one or more payloads associated with the one or more web API requests 306; and one or more library specific parameters (e.g., "dataType" for JQuery) associated with the one or more web API requests 306; a combination thereof; and/or the like. Resources associated with one or more web API requests 306 can comprise code samples, databases, documents, protocols, websites, a combination thereof, and/or the like that can be accessed via the one or more networks 304 (e.g., the Internet and/or cloud technology). Example, resources include, but are not limited to: wide area information server (WAIS) databases, file transfer protocol (FTP) servers, and/or telnet destinations. Endpoints associated with the one or more web API requests 306 can indicate the location of one or more resources. Queries associated with the one or more web API requests 306 can comprise one or more functions that can be used to filter criteria. The query functions can accept one or more parameters and return one or more values.

In determining the statistics, the aggregation component 314 can aggregate a plurality of web API requests 306. Further, the aggregation component 314 can arrange the plurality of web API requests 306 in a hierarchy based one or more of the determined statistics (e.g., type of web API, a resource, an endpoint, a query, a payload, and/or a library specific parameter).

In one or more embodiments, the aggregation component 314 can further generate information indicative of one or more lessons learned from a machine learning process (e.g., association rule mining) based on: a parameter value associated with one or more web API requests 306, a response field associated with one or more web API requests 306, a combination thereof, and/or the like. In one or more embodiments, the aggregation component 314 can utilize recurrent neural networks and/or any other suitable machine learning method to generate lessons learned regarding one or more web API requests 306. Accordingly, such web API requests 306 can be sent to the workloads layer 90 of the cloud computer environment depicted in FIG. 2, whereby, among other things, the web API requests 306 can be recorded and further analyzed by the summarizing code usage 96 and/or the data analytics processing 94 workloads.

For example, the aggregation component 314 can generate quantitative lessons learned such as, but not limited to: frequently used endpoints associated with the one or more web API requests 306; frequently used parameters (e.g. the top three used query parameters), and their values, associated with the one or more web API requests 306; parameter fields associated with the one or more web API requests 306 that are frequently utilized in combination with each other (e.g., the most utilized pair of query parameters); frequently used response fields associated with the one or more web API requests 306; endpoint sequences that can comprise a dataflow dependency (e.g., an authentication pattern which pertains to calling an endpoint to authenticate and then calling another endpoint for an operation, the get-id pattern which pertains to calling an endpoint to obtain a client specific token and then calling another endpoint for operation); a combination thereof; and/or the like. In another example, the aggregation component 314 can generate qualitative lessons learned. Qualitative lessons learned can comprise identifying one or more samples of code from the data repository 308 that include a combination of multiple parameters that are designated as important to an entity generating one or more of the web API requests 306. In various embodiments, the aggregation component 314 can generate quantitative lessons learned and qualitative lessons in conjunction and/or separately.

The clustering component 316 can generate one or more clusters of one or more web API requests 306 received by the reception component 312. The clustering component 316 can be operably coupled to the reception component 312, and/or the clustering component 316 can communicate with the reception component 312 via one or more networks 304. Additionally, the clustering component 316 can be operably coupled to the aggregation component 314, and/or the clustering component 316 can communicate with the aggregation component 314 via one or more networks 304. Further, while FIG. 3 illustrates the clustering component 316 as comprising the server 302, other embodiments in which the clustering component 316 is located outside the server 302 are also envisage. In one or more embodiments, the clustering component 316 can generate the one or more clusters based on statistics determined by the aggregation component 314 and/or lesson generated by the aggregation component 314.

In various embodiments, the clustering component 316 can use a clustering algorithm to designate one or more web API requests 306 as a cluster. In another example, the clustering component 316 can use a clustering algorithm to group two or more web API requests 306 from a plurality of web API requests 306 received by the reception component 312. Also, the clustering component 316 can group two or more web API requests 306 to form a cluster based on one or more similarities regarding: composition, structure, statistics, parameters, endpoints, a combination thereof, and/or the like. Further, the clustering component 316 can designate a web API request 306 included in a cluster as the subject cluster's representative. A cluster representative can serve as an indication of the composition of the subject cluster.

In other words, the clustering component 316 can: designate one or more web API requests 306 as a cluster; group two or more web API requests 306 together to form a cluster; and/or designate a cluster representative for a subject cluster. Each cluster generated by the clustering component 316 can comprise one or more web API requests 306 received by the reception component 312. The clustering component 316 can generate one or more clusters (e.g., by designating one or more web API requests 306 as one or more clusters and/or by grouping two or more web API requests 306 to form one or more clusters) based on similarities between web API requests 306, statistics determined by the aggregation component 314, and/or lessons generated by the aggregation component 314. Further one or more clusters can comprise a cluster representative, designated by the clustering component 316, that can serve as a representation of the kind of web API requests 306 that comprise a subject cluster.

In one or more embodiments, the clustering component 316 can use a cluster algorithm to group similar web API requests 306 for a given endpoint and control a number of representative web API requests 306. For example, the clustering component 316 can consider web API requests 306 to be similar based on the number of parameter fields each web API request 306 has in common. Web API requests 306 with the same parameter values can be considered by the clustering component 316 to be more similar to each other than web API requests 306 with different values, and for ordinal values (e.g., integer) closer values can be considered to be similar.

The clustering component 316 can utilize a distance function to dictate how a grouping (e.g., a cluster) can be obtained. The distance function can combine the following dimensions: whether or not a given parameter and/or response field is being used by a subject web API request 306; data values for a subject web API request 306; how a parameter value (e.g., a location input) is obtained; the direction of the response fields (e.g., a parameter value can be used for another web API request 306 and/or for a user interface); a combination thereof; and/or the like. For example, parameter values can be obtained: from another web API request 306 (e.g., foursquare_v2_id can come from a previous call to the FourSquare API: http://apiloursquare-.com/v2/venues/search); from hard-coded data (e.g., a code sample that has latitude and/or longitude values hard-coded and/or a code sample that is JavaScript Object Notation (JSON) formatted); and/or from outside a resource (e.g., a code sample that has latitude and/or longitude values provided outside a file).

In various embodiments, the clustering component 316 can generate one or more clusters by filtering out web API requests 306 that comprise one or more immaterial parameters (e.g., an identification parameter and/or an access key parameter). For example, an immaterial parameter can be a parameter that is so commonly incorporated into web API requests 306 that considering the immaterial parameter would fail to facilitate identifying varying degrees of similarity amongst the web API requests 306. The clustering component 316 can generate a distinct cluster for web API requests 306 found to share only immaterial parameters (e.g., identification and/or access related parameters) with a subject web API request 306. Further, the clustering component 316 can generate one or more clusters comprising the remaining web API requests 306 (e.g., web API requests 306 that share one or more query parameters with a subject web API request 306 other than immaterial parameters) based on at least a distance function as described herein.

For example, a web API request 306 can use one or more query parameters to specify a location input. The clustering component 316 can group web API requests 306 based on the query parameter used by a subject web API request 306. For instance, web API requests 306 containing a longitude and/or longitude parameter to specify location can be grouped in the same cluster, whereas web API requests 306 containing another distinct location parameter can be grouped into a different cluster. Additionally, the clustering component 316 can generate descriptions regarding the composition of a subject cluster. For one or more clusters, the clustering component 316 can create an overview of a subject cluster based on an intersection of parameters within the cluster. Also, for one or more clusters, the clustering component 316 can create a list of parameters included the subject cluster and/or the frequency of each parameter.

In various embodiments, the aggregation component 314 can determine statistics and/or generated lessons based on one or more clusters, one or more cluster representatives, and/or one or more cluster descriptions generated by the clustering component 316. In an embodiment, the system 300 can comprise the aggregation component 314 and not the clustering component 316. In another embodiment, the system 300 can comprise the clustering component 316 without the aggregation component 314. In another embodiment, the system 300 can comprise both the aggregation component 314 and the clustering component 316.

In various embodiments, the display component 318 can be operably coupled to the reception component 312, the aggregation component 314, and/or the clustering component 316. In various embodiments, the display component 318 can communicate with the reception component 312, the aggregation component 314, and/or the clustering component 316 via one or more networks 304. Additionally, while FIG. 3 illustrates the display component 318 as comprising the server 302, other embodiments in which the display component 318 is located outside the server 302 are also envisage.

The display component 318 can display features such as: one or more statistics determined by the aggregation component 314; one or more lessons generated by the aggregation component 314; one or more clusters generated by the clustering component 316; one or more cluster representatives designated by the clustering component 316; one or more cluster descriptions generated by the clustering component 316; and/or a combination thereof. The display component 318 can display the features via a screen including, but not limited to, a liquid crystal display (LCD) and/or a light-emitting diode (LED) display.

Figure 4:
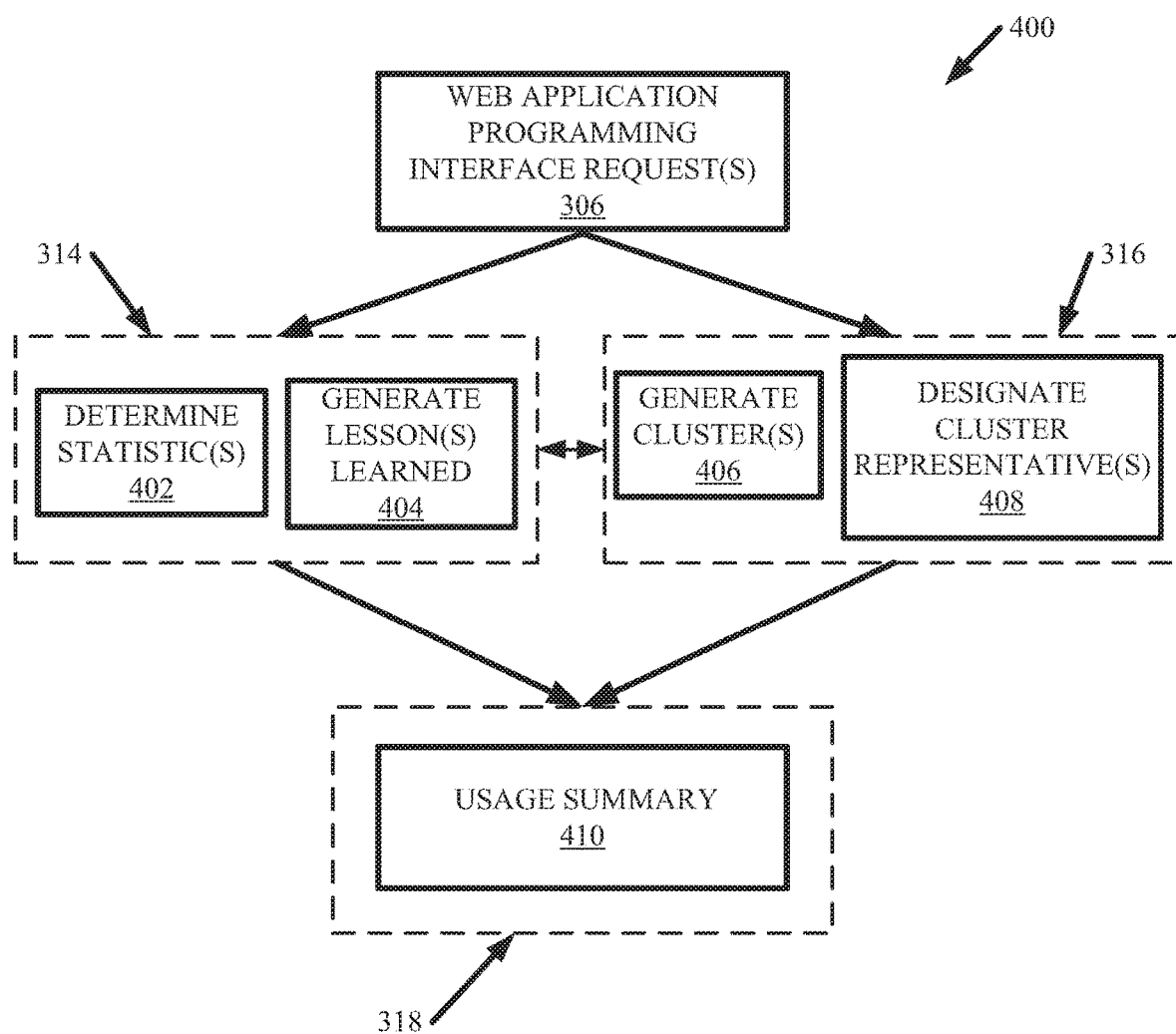
FIG. 4 illustrates a flow diagram of an example, non-limiting process that can be implemented by a system, computer program product, and/or computer-implemented method to summarize code usage associated with one or more web application programming interface requests in accordance with one or more embodiments described herein.

FIG. 4 illustrates a block diagram of a process 400 that can be implemented by system 300 in accordance with one or more embodiments described herein. Repetitive description of like elements employed in other embodiments described herein is omitted for sake of brevity. As shown in FIG. 4, the aggregation component 314 and/or the clustering component 316 can receive one or more web API requests 306. At 402 the aggregation component 314 can determine statistics regarding the web API requests 306 in accordance with various embodiments described herein. At 404 the aggregation component 314 can generate information indicative one or more lessons learned regarding the web API requests 306 in accordance with various embodiments described herein. At 406 the clustering component 316 can generate one or more clusters comprising the web API requests 306 in accordance with various embodiments described herein. At 408 the clustering component 316 can designate one or more cluster representatives from the web API requests 306 in accordance with various embodiments described herein.

In one or more embodiments, the aggregation component 314 and the clustering component 316 can communicate with each other and share outputs. Further, the outputs of the aggregation component 314 (e.g., statistics and/or lessons learned) and/or the clustering component 316 (e.g., clusters and/or cluster representatives) can be sent to the display component 318. At 410, the display component 318 can display a usage summary comprising one or more of the outputs. In one or more embodiments, the usage summary can comprise one or more outputs from only the aggregation component 314. In various embodiments, the usage summary can comprise one or more outputs from only the clustering component 316. In various embodiments, the usage summary can comprise one or more outputs from both the aggregation component 314 and the clustering component 316.

Figure 5:
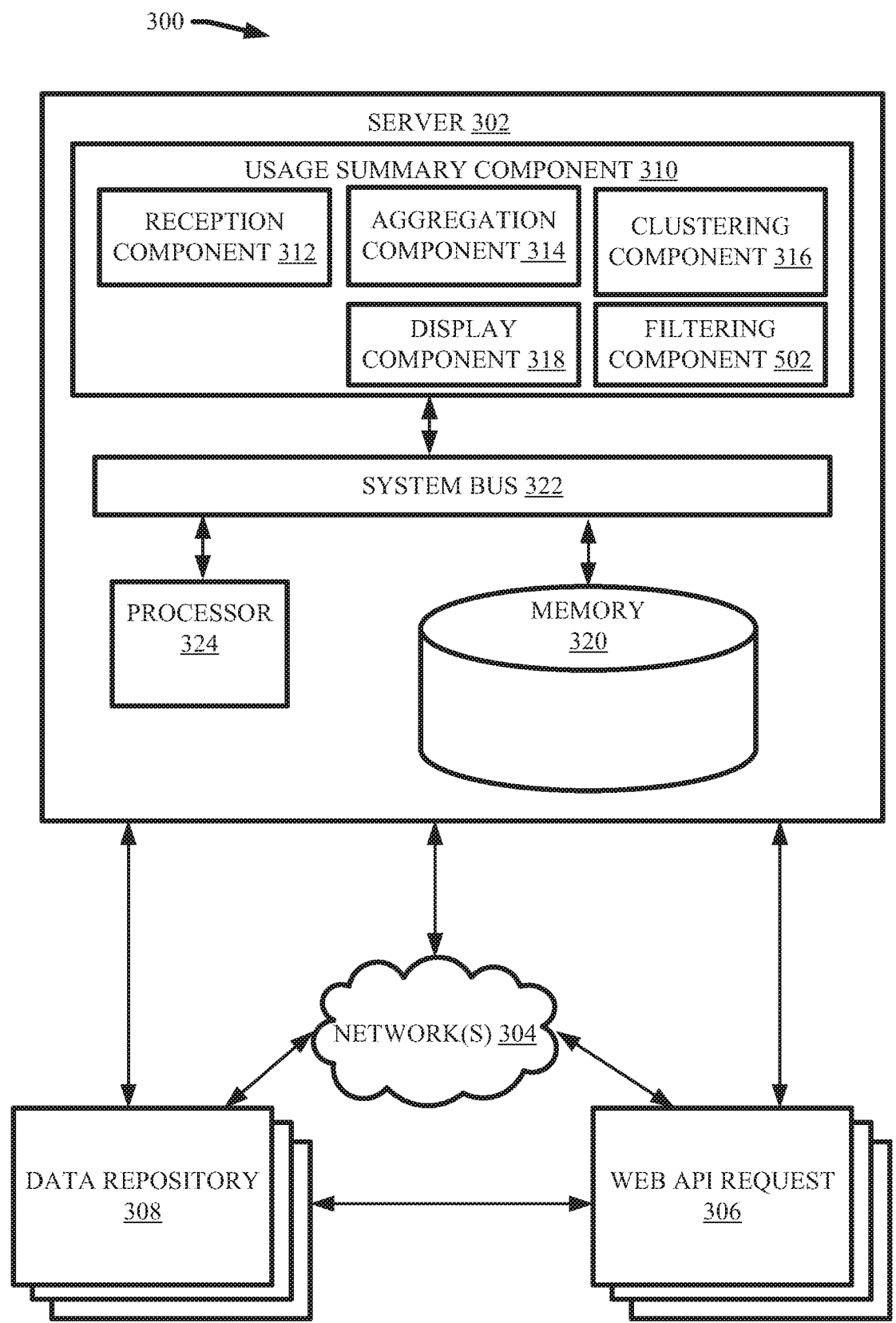
FIG. 5 illustrates a block diagram of an example, non-limiting system that can summarize code usage associated with one or more web application programming interface requests in accordance with one or more embodiments described herein.

FIG. 5 illustrates another block diagram of the system 300 further comprising a filtering component 502. Repetitive description of like elements employed in other embodiments described herein is omitted for sake of brevity. In various embodiments, the filtering component 502 can be operably coupled to the reception component 312, the aggregation component 314, and/or the clustering component 316. In various embodiments, the filtering component 502 can communicate with the reception component 312, the aggregation component 314, and/or the clustering component 316 via one or more networks 304. Additionally, while FIG. 5 illustrates the filtering component 502 as comprising the server 302, other embodiments in which the filtering component 502 is located outside the server 302 are also envisage.

The filtering component 502 can filter the web API requests 306 to identify one or more web API requests 306 that meet one or more quality standards. In various embodiments, the filtering component 502 can filter the web API requests 306 prior to their evaluation by the aggregation component 314 and/or the clustering component 316 to ensure that the outputs of the aggregation component 314 and/or the clustering component 316 are based on high quality web API requests 306.

In one or more embodiments, the filtering component 502 can filter one or more web API requests 306 based on a reputation established by a data repository 308 associated with a subject web API request 306 and/or the web API that generated the subject web API request 306. The reputation can regard a subject web API request 306 and/or data associated with a subject web API request 306. The reputation can be indicated via a rating system (e.g., a number of likes, stars, thumbs-up, and/or the like) and/or use frequency (e.g., the number of forks associated with a subject web API request 306).

In one or more embodiments, the filtering component 502 can filter one or more web API requests 306 based on comparing a subject web API request 306 to one or more specifications, wherein the specifications can be defined by a user of the system 300. In various embodiments, the filtering component 502 can filter one or more web API requests 306 based on one or more parameters contained in the web API requests 306. For example, the filtering performed by the filtering component 502 can be based on one or more parameters regarding, but not limited to: framework of a web API request 306; client specific values of a web API request 306; and usage (e.g., frequency and/or use history) of a web API request 306. Further, the filtering component 502 can use one or more artificial intelligence techniques to combine filtering parameters. For example, the filtering component 502 can utilized a rule-based approach to filter one or more web API requests 306. Also, where training data is available (e.g., annotated web API requests 306 that were previously determined to be of high quality) the filtering component 502 can use one or more machine learning techniques to filter web API requests 306.

Figure 6:
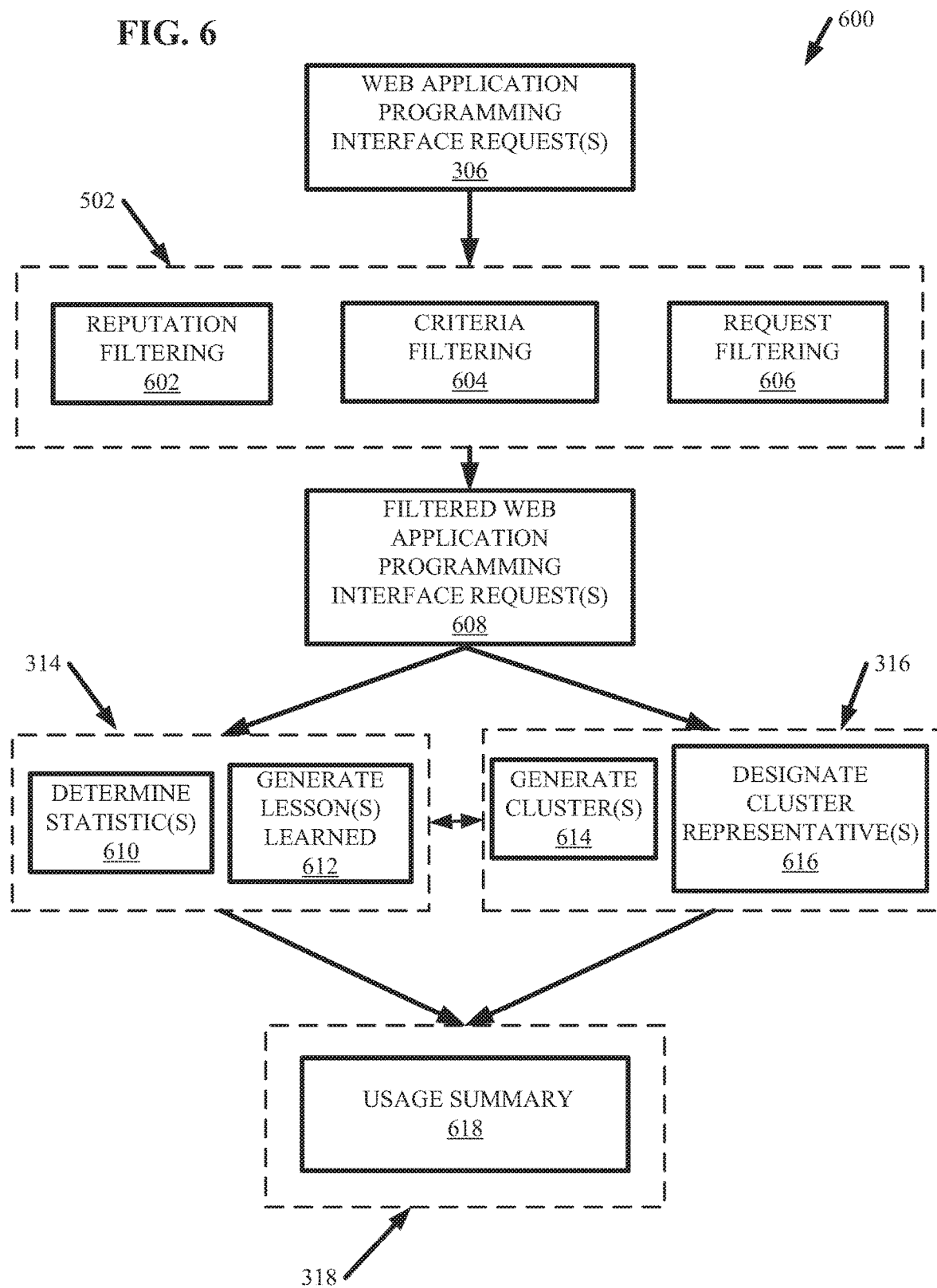
FIG. 6 illustrates a flow diagram of an example, non-limiting process that can be implemented by a system, computer program product, and/or computer-implemented method to summarize code usage associated with one or more web application programming interface requests in accordance with one or more embodiments described herein.

FIG. 6 illustrates a block flow diagram of an example, non-limiting process 600 that can be implemented by a system 300 comprising at least filtering component 502 in conjunction with aggregation component 314, clustering component 316, and/or display component 318. Repetitive description of like elements employed in other embodiments described herein is omitted for sake of brevity. As shown in FIG. 6, the filtering component 502 can receive one or more web API requests 306. At 602, the filtering component 502 can perform reputation filtering to filter the one or more web API requests 306 in accordance with the embodiments described herein. For example, the filtering component 502 can filter one or more web API requests 306 based on a reputation established by a data repository 308 and/or a web API. At, 602 the filtering component 502 can perform criteria filtering to filter the one or more web API requests 306 in accordance with the embodiments described herein. For example, the filtering component 502 can filter the one or more web API requests 306 based on comparison of a subject web API request 306 with one or more specifications to determine the presence, or lack thereof, of criteria. At 606, the filtering component 502 can perform request filtering to filter the one or more web API requests 306 in accordance with the embodiments described herein. For example, the filtering component 502 can filter the one or more web API requests 306 based on one or more parameters that may be contained in the web API requests 306. The filtering component 502 can output filtered web API requests 608 that can be considered as having a high quality.

The aggregation component 314 and/or the clustering component 316 can receive one or more filtered web API requests 608. At 610 the aggregation component 314 can determine statistics regarding the filtered web API requests 608 in accordance with various embodiments described herein. At 612 the aggregation component 314 can generate information indicative of one or more lessons learned regarding the filtered web API requests 608 in accordance with various embodiments described herein. At 614 the clustering component 316 can generate one or more clusters comprising the filtered web API requests 608 in accordance with various embodiments described herein. At 416 the clustering component 316 can designate one or more cluster representatives from the filtered web API requests 608 in accordance with various embodiments described herein.

In one or more embodiments, the aggregation component 314 and the clustering component 316 can communicate with each other and share outputs. Further, the outputs of the aggregation component 314 (e.g., statistics and/or lessons learned) and/or the clustering component 316 (e.g., clusters and/or cluster representatives) can be sent to the display component 318. At 618, the display component 318 can display a usage summary comprising one or more of the outputs. In one or more embodiments, the usage summary can comprise one or more outputs from only the aggregation component 314. In various embodiments, the usage summary can comprise one or more outputs from only the clustering component 316. In various embodiments, the usage summary can comprise one or more outputs from both the aggregation component 314 and the clustering component 316.

Figure 7:
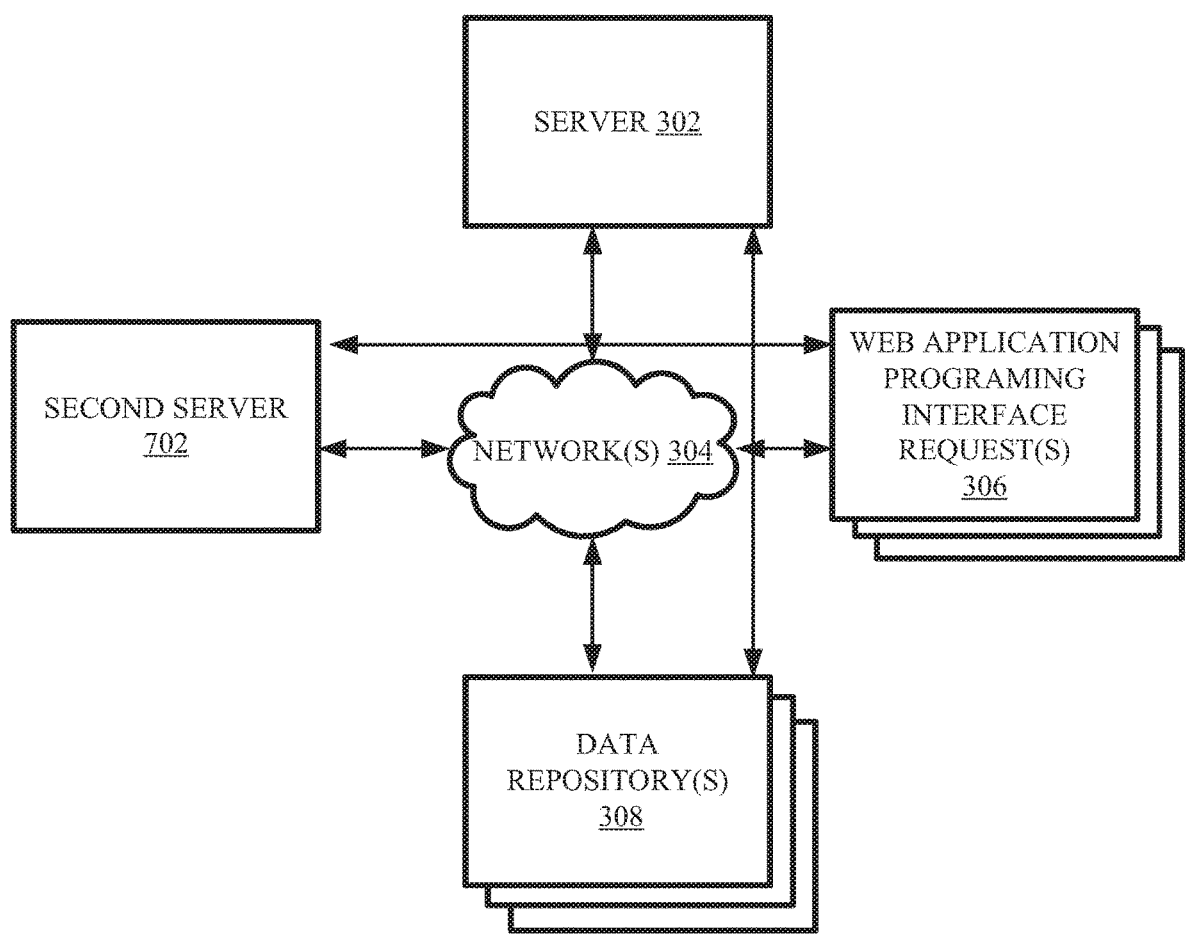
FIG. 7 illustrates a block diagram of an example, non-limiting system that can summarize code usage associated with one or more web application programming interface requests in accordance with one or more embodiments described herein.

FIG. 7 illustrates a block diagram of the system 300 comprising a second server 702. Repetitive description of like elements employed in other embodiments described herein is omitted for sake of brevity. The second server 702 can comprise the components described herein in regards to server 302 and can perform the features described herein in regards to server 302. The second server 702 can be operably coupled to the server 302, and/or the second server 702 can communicate with the server 302 via one or more networks 304. The second server 702 can be operably coupled to one or more data repositories 308, and/or the second server 702 can communicate with one or more data repositories 308 via one or more networks 304. The second server 702 can directly receive one or more web API requests 306, and/or the second server 702 can receive one or more web API requests 306 via one or more networks 304.

The second server 702 and/or the server 302 can share one or more outputs identified and/or generated by a respective aggregation component 314, clustering component 316, and/or filtering component 502. In one or more embodiments, the second server 702 can generate parts of a usage summary (e.g., via process 400 and/or process 600), while the server 302 can generate the remaining parts of the usage summary (e.g., via process 400 and/or 600). In other words, the system 300 can comprise a server 302 and a second server 702 that can share the workload described herein (e.g., process 400 and/or process 600).

Figure 8:
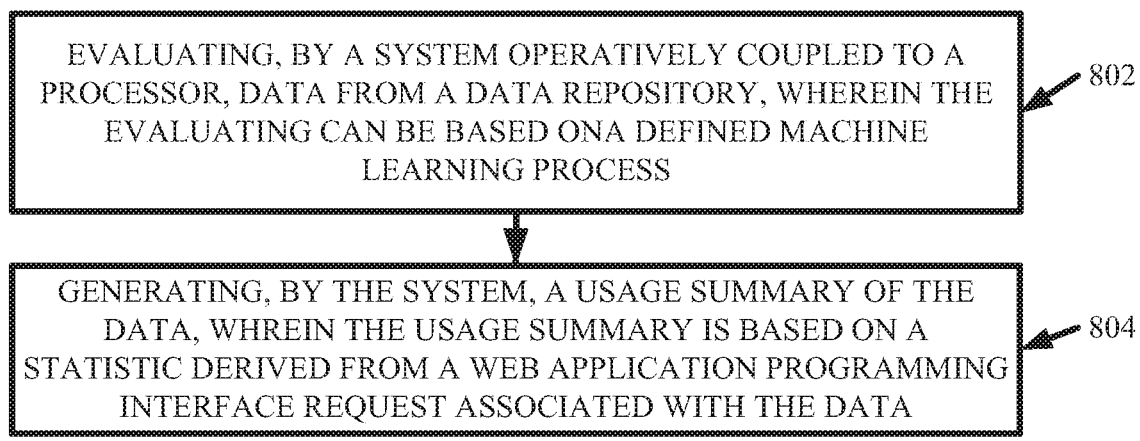
FIG. 8 illustrates a flow chart of an example, non-limiting computer-implemented method that can facilitate summarizing code usage associated with one or more web application programming interface requests in accordance with one or more embodiments described herein.

FIG. 8 illustrates a flow chart of a computer-implemented method 800 that can facilitate generating a usage summary regarding data associated with one or more web API requests 306. At 802, the method 800 can comprise evaluating, by a system 300 operatively coupled to a processor 324, data from a data repository 308, wherein the evaluating can be based on a defined machine learning process. At 804, the method can further comprise generating, by the system 300 (e.g., via aggregation component 314), a usage summary of the data, wherein the usage summary can be based on a statistic derived (e.g., via aggregation component 314) from a web application programming interface request 306, and the web API request 306 can be associated with the data. For example, the generating can comprise aggregating (e.g., via aggregation component 314) a plurality of web API requests 306, and the aggregating can arrange the plurality of web API requests 306 in a hierarchy based on a factor selected from a group consisting of a type of web API, a resource, an endpoint, a query, a payload, and a library specific parameter. Also, the statistic can be selected (e.g., via aggregation component 314) from a group consisting of an endpoint statistic for the web API request 306 and a parameter statistic for the web API request 306.

Figure 9:
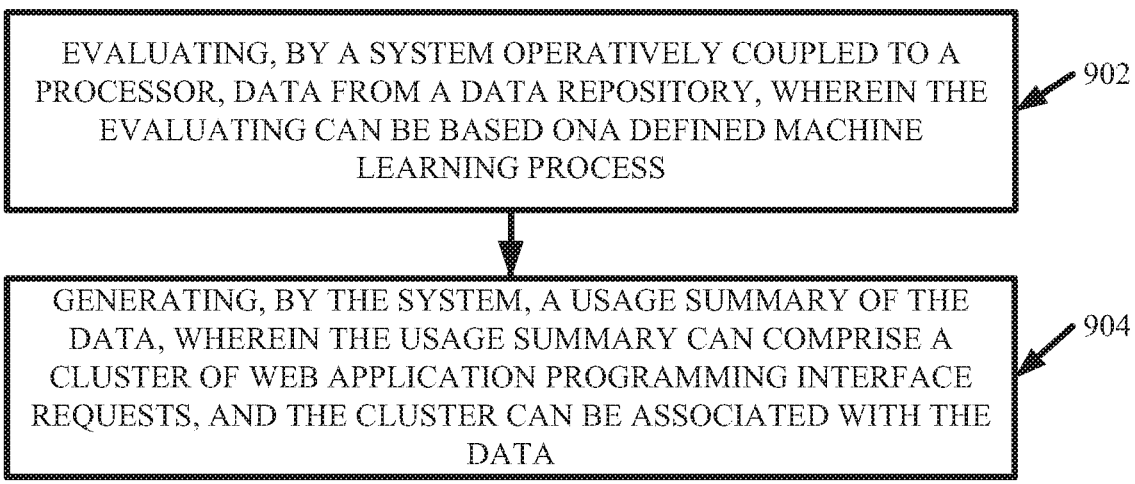
FIG. 9 illustrates another flow chart of an example, non-limiting computer-implemented method that can facilitate summarizing code usage associated with one or more web application programming interface requests in accordance with one or more embodiments described herein.

FIG. 9 illustrates a flow chart of a computer-implemented method 900 that can facilitate generating a usage summary regarding data associated with one or more web API requests 306. At 902, the method 900 can comprise evaluating, by a system 300 operatively coupled to a processor 324, data from a data repository 308, wherein the evaluating can be based on a defined machine learning process. At 904, the method 900 can further comprise generating, by the system 300 (e.g., via clustering component 316), a usage summary of the data, wherein the usage summary comprises a cluster of web API requests 306 from a plurality of web API requests 306, and the cluster of web API requests 306 can be associated with the data. For example, the cluster of web API requests 306 can be formed by the system 300 (e.g., via clustering component 316) using a clustering algorithm o group two or more web API requests 306 from the plurality of web API requests 306. Also, the cluster of web API requests 306 can comprise a cluster representative to represent a composition of the cluster of web API requests 306.

Figure 10:
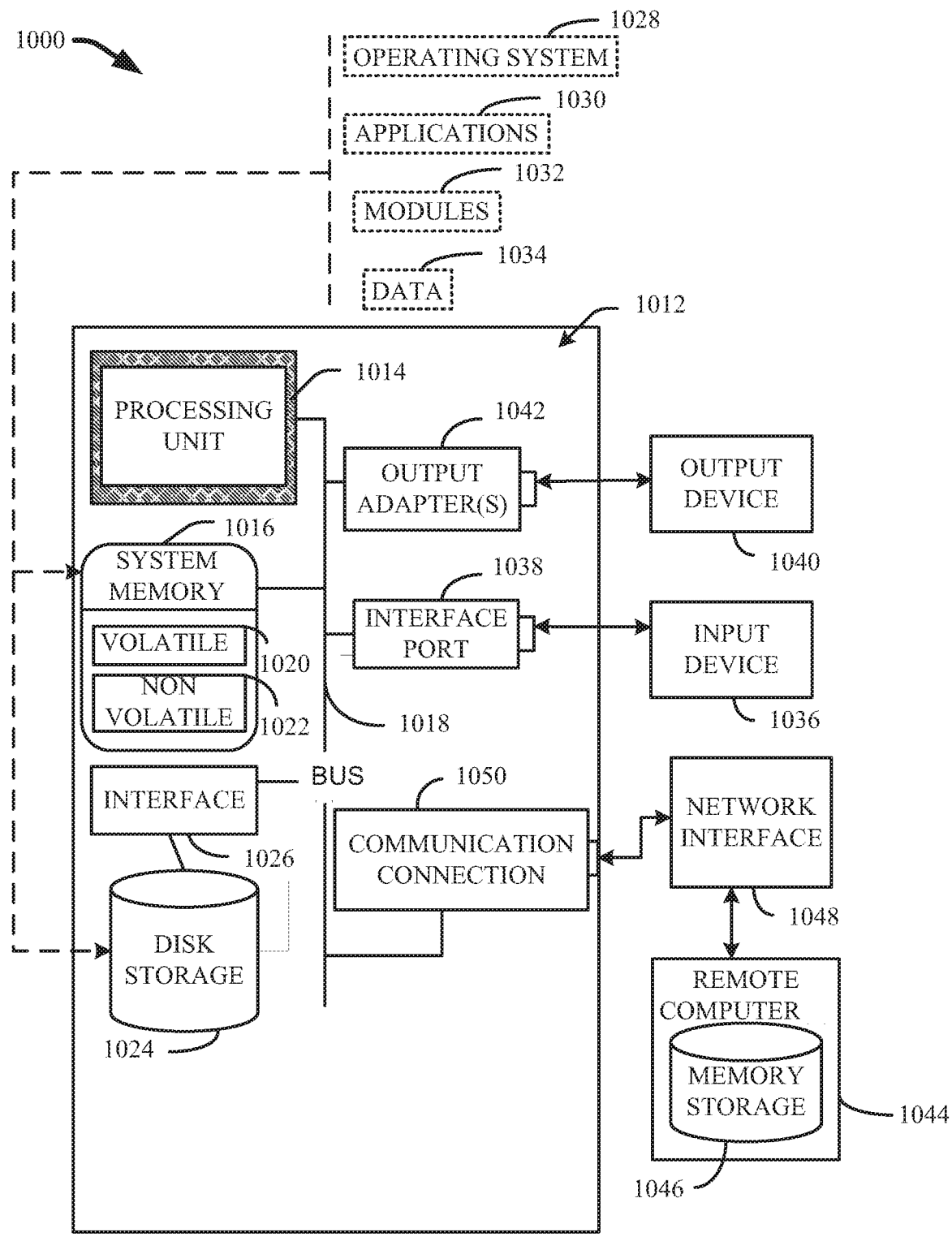
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for summarizing data usage associated with a web application programming interface request, the computer program product comprising a computer readable storage medium having program instructions embodied therewith, the program instructions executable by a processor to cause the processor to:
   evaluate data from a data repository based on a defined machine learning process;
   generate a usage summary of the data, wherein the usage summary comprises:
      a statistic derived from the web application programming interface request associated with the data;
      a cluster of web application programming interface requests from a plurality of web application programming interface requests, the cluster of web application programming interface requests associated with the data; and
      quantitative information indicative of a lesson learned from a second machine learning process, wherein the lesson learned comprises frequently used response fields associated with the web application programming interface requests; and
   transmit the web application programming interface requests to a workloads layer of a cloud computer environment for recordation of the web application programming interface requests,
      wherein the cluster of web application programming interface requests is determined based on a distance function that combines a first dimension indicative of whether a defined parameter is used by a web application programming interface request or how a parameter value is obtained.

2. The computer program product of claim 1, wherein the program instructions further cause the processor to filter a second plurality of web application programming interface requests to identify the plurality of web application programming interface requests and the web application programming interface request.

3. The computer program product of claim 1, wherein the data repository is located in the cloud computer environment.

4. The computer program product of claim 1, wherein generation of the usage summary data comprises aggregation of the plurality of web application programming interface requests, wherein the aggregation arranges the plurality of web application programming interface requests in a hierarchy based on an endpoint and a payload.

5. The computer program product of claim 1, wherein generation of the usage summary data comprises aggregation of the plurality of web application programming interface requests, wherein the aggregation arranges the plurality of web application programming interface requests in a hierarchy based on a library specific parameter.

6. The computer program product of claim 1, wherein the statistic is an endpoint statistic for the web application programming interface request.

7. The computer program product of claim 1, wherein the statistic is a parameter statistic for the web application programming interface request.

8. The computer program product of claim 1, wherein the lesson learned further comprises frequently used query parameters associated with the web application programming interface requests.

9. The computer program product of claim 8, wherein the lesson learned further comprises corresponding values for the frequently used query parameters associated with the web application programming interface requests.

10. The computer program product of claim 1, wherein the lesson learned further comprises endpoint sequences comprising a dataflow dependency.

11. The computer program product of claim 10, wherein the dataflow dependency comprises an authentication pattern that pertains to calling an endpoint to authenticate and then calling another endpoint for an operation.

12. The computer program product of claim 10, wherein the dataflow dependency comprises a get-id pattern that pertains to calling an endpoint to obtain a client specific token and then calling another endpoint for operation.

13. The computer program product of claim 1, wherein the usage summary further comprises:
   qualitative information indicative of a second lesson learned from the second machine learning process, wherein the qualitative information and the quantitative information are generated in conjunction.

14. The computer program product of claim 13, wherein the qualitative information comprises an identified one or more samples of code from the data repository that include a combination of parameters designated as important to an entity generating the one or more web application programming interface requests.

15. The computer program product of claim 1, wherein the program instructions are executable by a processor to cause the processor to:
   filter the plurality of web application programming interface requests to identify the web application programming interface request, and wherein the web application programming interface request is one of the plurality of web application programming interface requests.

16. The computer program product of claim 15, wherein the filtering is based on a reputation of the data, the reputation being established by the data repository, and the data being associated with the web application programming interface request.

17. The computer program product of claim 16, wherein the filtering uses an artificial intelligence application selected from a group consisting of a rule-based process and a machine learning process.

18. The computer program product of claim 1, wherein the query parameters are employed to determine a location input, wherein the location is specified by longitude and latitude parameters of the web application programming interface requests.

* * * * *